UNITED STATES PATENT OFFICE.

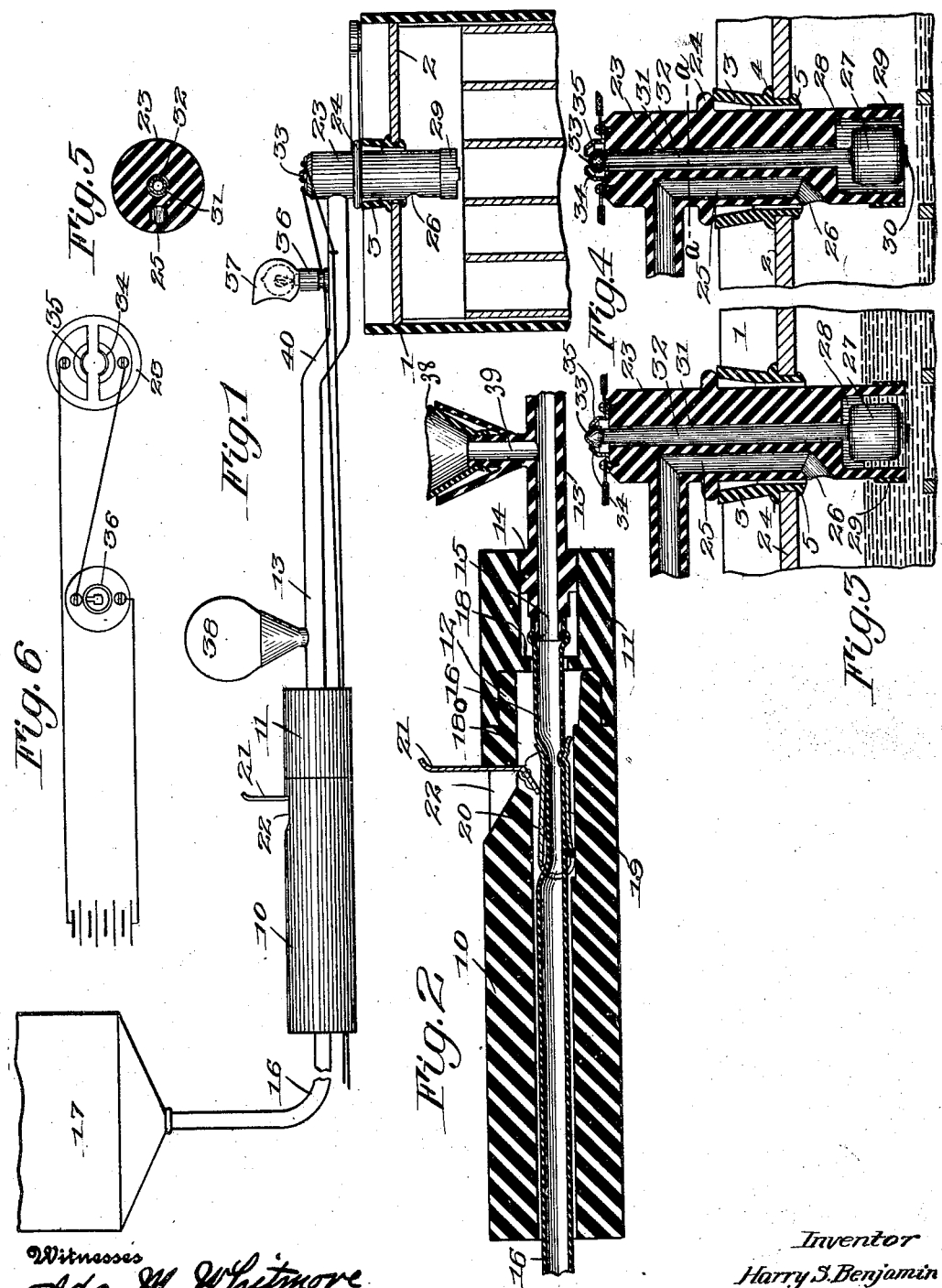

HARRY S. BENJAMIN, OF ROCHESTER, NEW YORK.

FILLING DEVICE.

1,154,476. Specification of Letters Patent. Patented Sept. 21, 1915.

Application filed December 9, 1912. Serial No. 735,678.

*To all whom it may concern:*

Be it known that I, HARRY S. BENJAMIN, of Rochester, in the county of Monroe and State of New York, have invented a new and useful Improvement in Filling Devices, which improvement is fully set forth in the following specification and shown in the accompanying drawings.

The present invention relates to filling devices and an object of the same is to provide a construction especially designed for filling the cells of storage batteries with water, provisions preferably being made for indicating when a certain level is reached within a cell and for withdrawing a portion of the liquid from a cell, the construction of the device being such that it may readily be fitted within the filling opening of a cell and when in position not producing a short circuit.

To these and other ends the invention consists in certain parts and combinations of parts all of which will be hereinafter described, the novel features being pointed out in the appended claims.

In the drawings: Figure 1 illustrates the filling device in position within a storage battery cell, the cell being shown in section and the device being shown in side elevation and connected to a suitable supply; Fig. 2 is an enlarged longitudinal section of the hand piece showing the cutoff valve arranged therein; Figs. 3 and 4 are vertical sections of the discharge end of the filling device, portions of the cell being shown in section, and the float being shown in two different positions; Fig. 5 is a section on the line *a—a*, Fig. 4; and Fig. 6 shows diagrammatically the circuits leading from the float controlled terminals to the signaling device or lamp.

While great advances have been made, in recent years, in the construction of storage battery cells, these advances have mainly been directed toward the securing of greater efficiency in the electrical elements of such cell. The manner of filling these cells has not kept step with the improvements in the other parts thereof. At present it is the custom to employ a rubber plug fitting in the filling opening and, when removed, permitting the water to be supplied to the cell. This plug, in time, becomes hardened and the removal and refitting thereof becomes difficult. Furthermore, as the water should always be introduced into the cell up to a certain level in order to secure the proper efficiency in the cell, the filling of the cell in the proper manner has been very difficult.

According to the present invention, there is employed a plug adapted for attachment to the ordinary storage battery cell and having provision preventing the filling of the cell without the removal of the plug. Furthermore, a filling device is employed for coöperation with this plug and preferably has suitable indicating means for determining the proper level of the liquid in the cell and also suitable means for withdrawing an over supply of said liquid, the construction of the filling device being such that it will not produce a short circuit in the cell, while, at the same time, it may be introduced into small places with convenience, it being customary to place these cells in out-of-the-way places where there is but very little space above them.

Referring more particularly to the drawings, 1 indicates a storage battery cell and 2 the top thereof provided with the usual opening for receiving the plug, comprising a tubular body portion 3 made of soft rubber and having two surrounding shoulders 4 and 5, the lower one being of smaller diameter than the upper and being adapted to be passed through the opening in the top 2 of the cell in order that said top may lie between the shoulders.

The filling device may comprise a hand piece formed of two telescoping members 10 and 11. The member 10 is of tubular construction and has a reduced portion 12 fitting in the portion 11. This hand piece is preferably made of hard rubber and to the forward end thereof is secured a delivery tube 13 also made of hard rubber and having a surrounding enlargement 14 which fits within the bore of the forward handle member 11, being provided beyond said enlargement with a nipple 15 to which the flexible tube or hose 16, leading to the tank or supply 17 through the handle member 10, is secured. An internal annular flange 18 may be arranged within this forward member 11 to coöperate with that portion of the flexible tube 16 which fits on the nipple 15 in order to prevent said flexible tube being withdrawn from said nipple by pulling thereon. The flexible tube may, however, be removed from the nipple by pulling on the delivery tube 13 to withdraw the latter from the forward handle member 11, the flexible tube sliding through the handle sleeve 10 so that the connection is entirely removed from within the handle to the exterior thereof in order that manipulation of said connection may take place.

The flow of the water through the filling device may be controlled by a valve in the form of a tube compressor of any suitable or ordinary construction arranged within an enlarged chamber 180 in the handle member 10 and comprising a fixed jaw 19 and a spring jaw 20 which is moved toward the fixed jaw 19 through the medium of a pivoted cam lever 21, said cam lever extending through an opening 22 in the member 10 communicating with the chamber 180.

At the forward end of the delivery tube 13, a depending discharge member 23 may be provided preferably in the form of an elongated cylindrical body having the delivery tube 13 connected thereto near its upper end, said body being adapted to be passed through the opening of the plug 3 and having a surrounding annular flange 24 adapted to rest upon top of the plug 3 in order that the lower end of the discharge 23 will be properly positioned with relation to the upper end of the grids in the cell. The body is provided with a passage-way 25 leading downwardly from the delivery tube passage-way and discharging laterally at 26 below the collar 24 and above the lower end of the body 23.

For the purpose of indicating when the water in the battery has reached a certain level, there may be provided an indicating means comprising preferably a float 27 made of glass and confined within a chamber 28 in the lower end of the body 23 by means of a device consisting of a rubber sleeve 29 fitted over the lower end of the body 23 and having a cross piece 30. Projecting upwardly from the float 27 through a central bore 31 in the body 23 is a tubular glass extension on the float preferably having at its upper end, above the body 23, a metallic or German silver cap 33 which is adapted to connect a pair of terminals 34 and 35 and thus establish an electrical circuit to the lamp 36 preferably arranged on the delivery tube 13 inclosed by a hood 37 directing the rays toward the user. The circuit of the lamp is shown in Fig. 6, the conductor wires following the delivery tube 13 and passing through the hand piece to suitable contacts which may be attached to the binding post of the storage battery.

Should an over supply of water be fed to the cell, such water may be removed by compressing the rubber bulb 38 or other suction device connected to the delivery tube 13 by a passageway 39 in proximity to the handle piece so that, when pressure on the bulb is released, said bulb will draw water from the cell by way of the delivery tube 13. The delivery tube may be provided with a downward bend or offset 40 which enables the hand piece to be elevated slightly with reference to the body 23 so that the hand of a user of the device will not contact with electrical parts of other cells while filling any one cell.

In using this invention, the cap on the plug of a cell is first thrown to an open position, after which the body 23 is introduced through the plug to the position shown in Fig. 1. The tube compressor is operated to permit a flow from the supply tank 17 to the cell 1 until the float 27 is raised to establish connection between the contacts 34 and 35, thus giving the user a signal through the lamp 36, after which the tube compressor is operated to cut off the supply.

What I claim as my invention and desire to secure by Letters Patent is:

1. In a device of the class described, the combination with a discharge member having a pocket therein, of a float arranged in said pocket, and a retainer for holding the float in the pocket comprising a rubber sleeve fitting over the discharge member and having a cross piece confining the float in the pocket.

2. In a device of the class described, the combination with a hollow hand piece formed of two members, one of which is provided with an enlarged chamber adjacent to the other, a flexible tube extending through said chamber, a tube compressor arranged in said chamber and having an operating portion pivotally mounted on the compressor and within the chamber and extending to the exterior of the hand piece, and a rigid delivery tube extending from the hand piece.

3. In a device of the class described, the combination with a hand piece formed of two telescoping hollow members, one of which is provided with an enlarged chamber opening laterally and the other of which is provided with an interior annular shoulder, of a rigid delivery tube having one end fitting in the last mentioned member and provided with a nipple in proximity to the annular shoulder, a flexible tube extending through the first named handle member and secured to the nipple to which it is held by the shoulder, and a tube compressor arranged in said chamber and having an operating portion extending through the lateral opening.

4. In a device of the class described, the combination with a substantially cylindrical discharge member made of non-conducting material and having a downwardly opening pocket in its lower end and a bore extending from the pocket centrally through said member to the upper end thereof, of a float made of non-conducting material, arranged within said pocket and having a stem extending through the central bore, a discharge tube of a non-conducting material connected to the discharge member, said discharge member having a passageway which communicates with the discharge tube and opens at one side of the discharge member above the pocket, a hand piece rigidly secured to the other end of the discharge tube, a flexible tube connected with the hand piece, a conducting piece carried by the upper end of the stem, a pair of contacts arranged on the discharge member and adapted to be electrically connected by said contact, and a signaling circuit connected to said contacts.

5. In a device of the class described, the combination with a hand piece having a suitable supply connected thereto, of a discharge member connected to said hand piece and carrying a float, a suction device for withdrawing liquid by way of said discharge member, and a signaling device controlled by said float.

6. In a device of the class described, the combination with a hand piece having a suitable supply connected thereto, and a discharge member adapted to receive a liquid from the hand piece, of a suction device for withdrawing liquid through the discharge member, and a signaling device controlled by said suction device for determining when a suitable amount of liquid has been withdrawn.

HARRY S. BENJAMIN.

Witnesses:
HAROLD H. SIMMS,
ADA M. WHITMORE.